(12) United States Patent
Dolenti et al.

(10) Patent No.: US 8,490,649 B2
(45) Date of Patent: Jul. 23, 2013

(54) TORQUE INDICATOR

(75) Inventors: William T. Dolenti, Lynchburg, VA (US); Daniel J. Morris, Forest, VA (US); William C. Hooss, Rustburg, VA (US); Byron A. Fleury, St. James, NY (US)

(73) Assignee: Flowserve Management Company, Irving, TX (US)

( * ) Notice: Subject to any disclaimer, the term of this patent is extended or adjusted under 35 U.S.C. 154(b) by 627 days.

(21) Appl. No.: 12/227,084

(22) PCT Filed: May 4, 2006

(86) PCT No.: PCT/US2006/017433
§ 371 (c)(1),
(2), (4) Date: Feb. 8, 2011

(87) PCT Pub. No.: WO2007/130042
PCT Pub. Date: Nov. 15, 2007

(65) Prior Publication Data
US 2011/0146818 A1    Jun. 23, 2011

(51) Int. Cl.
*F16K 37/00*       (2006.01)
(52) U.S. Cl.
USPC ............ 137/551; 73/862.326; 74/552; 81/52; 81/467
(58) Field of Classification Search
USPC .......................... 73/862.23; 137/551; 74/552
See application file for complete search history.

(56) References Cited

U.S. PATENT DOCUMENTS

| 2,059,366 A | 11/1936 | Kinzie |
| 2,256,406 A | 9/1941 | Muir |
| 2,269,503 A * | 1/1942 | Zimmerman ............... 73/862.26 |
| 4,416,644 A * | 11/1983 | Kulischenko et al. .......... 464/52 |
| 6,799,480 B1 * | 10/2004 | Walsh et al. ............... 73/862.21 |

FOREIGN PATENT DOCUMENTS

| CN | 2060229 U | 8/1990 |
| CN | 1156247 A | 8/1997 |
| CN | 2320377 Y | 5/1999 |

OTHER PUBLICATIONS

International Search Report for PCT/US06/17433, dated Jun. 3, 2008, 3 pages.

* cited by examiner

*Primary Examiner* — Hezron E Williams
*Assistant Examiner* — Alexander Mercado
(74) *Attorney, Agent, or Firm* — TraskBritt

(57) ABSTRACT

Torque indicator markings incorporated with handwheel devices connected to actuators or valve assemblies provide visual indication of the amount of torque being applied to an actuator or valve assembly by the handwheel device. Tattletale torque indicators incorporated with a handwheel device further provide a persistent indication of the maximum amount of torque applied to an actuator or valve assembly connected to the handwheel device.

20 Claims, 7 Drawing Sheets

TORQUE INDICATOR

TECHNICAL FIELD

The present invention relates to torque indicators applied to a valve assembly and more particularly to visual indicators for determining whether the amount of torque being asserted on an actuator or valve assembly by a handwheel exceeds the torque limits thereof and to maximum torque indicators.

BACKGROUND

Actuators and valve assembly components may be operated or driven by devices such as handwheel assemblies. The rotation of a handwheel in either a clockwise or counter-clockwise direction imparts a rotational force on a drive shaft, which in turn, operates an actuator or valve assembly. For example, a handwheel device typically used to drive actuators and valve assemblies is illustrated in FIG. 1. Rotation of the handwheel drives a shaft or drive sleeve within the actuator, which in turn either drives a valve stem directly, or indirectly via a set of gears. The use of handwheels and handwheel devices with actuators and valve assemblies is well known.

Actuators and valve assemblies driven by handwheels are typically subject to torque limitations. Application of torque beyond the torque limits of an actuator or valve assembly can damage the actuator or valve assembly. Once an excessive amount of torque has been applied to an actuator or a valve assembly, the device typically needs replacement.

To prevent damage caused by the excessive application of torque, warnings are usually printed in the user manuals that accompany the actuators or valve assemblies. In other instances, warnings may also be placed on actuator housings or on handwheels attached to an actuator in order to discourage an over-application of torque to the assembly. During operation, however, it is difficult, if not impossible, for an operator to determine the amount of torque being applied to an actuator or valve assembly. This is especially true when an operator can only estimate the amount of torque that is being applied to a device based upon their experience or on a feel for the amount of force that they are applying at any given time.

In many cases, there is no mechanism to prevent the application of an excessive amount of torque to an actuator or a valve assembly. More often than not, when excessive torque is applied to an actuator or valve assembly, the excessive torque causes damage to the actuator or valve assembly, resulting in the need for maintenance or replacement of the actuator or valve assembly. Therefore, it would be desirable to provide a mechanism by which an operator could determine whether the torque limits of an actuator or valve assembly have been exceeded.

Although the application of excessive force and torque to an actuator or valve assembly is undesirable, emergency situations may arise which require such application. In those instances, the ability of an operator to override the torque limits for an actuator or valve assembly should not be hindered.

Furthermore, in many of the cases where damage is caused by the use of excessive torque with a device, the manufacturer may be called upon to fix the device based upon a warranty. The inability of the manufacturer to determine whether a device was damaged due to the application of an excessive amount of torque to the device or whether some other legitimate damage occurred is important. Therefore, it is desirable to provide a mechanism by which manufacturers may monitor or determine when damage to an actuator or valve assembly has been caused by the application of excessive amounts of torque to the device rather than by a defect or normal wear-and-tear of the device.

Thus, there is a need to provide a mechanism by which the torque applied to an actuator or valve assembly device may be monitored in order to help prevent damage to an actuator or valve assembly. It is also desirable to provide a mechanism for indicating when the torque limits of an actuator or valve assembly have been exceeded by a user.

DISCLOSURE OF INVENTION

Embodiments of the present invention relate to devices that are capable of indicating the level of torque being applied to an actuator or a valve assembly capable of being driven by the handwheel. More particularly, embodiments of the invention include torque indicators capable of recording the amount of torque being applied to an actuator or a valve assembly by the operation of a handwheel or other device connected to the actuator or valve assembly. Embodiments of the invention also provide tattletale torque indicators that record or indicate the largest amount of torque that has been applied to an actuator or valve assembly by a handwheel or other device over a period of time.

In some embodiments of the invention, one or more torque indicator markings and a pointer are configured with a handwheel device or other device capable of driving an actuator or valve assembly. The positioning of the pointer relative to the torque indicator markings may indicate the amount of torque or a range of force being applied to an actuator or valve assembly by rotation or movement of the handwheel device or other device driving the actuator or valve assembly.

In other embodiments of the invention, a tattletale torque indicator is configured with a handwheel device or other device capable of driving an actuator or valve assembly. The tattletale torque indicator may record or indicate the maximum amount of torque that has been applied to the actuator or the valve assembly by the handwheel device or other device over a period of time. The tattletale torque indicator may be visible to an operator of the handwheel device or other device, or it may be hidden from view such that disassembly of the handwheel device or other device is required to determine the maximum amount of torque applied to an actuator or valve assembly.

According to some embodiments, a handwheel device may include a rotation shaft connected to a handwheel and a drive shaft connected to an actuator or valve assembly for driving the actuator or valve assembly. One or more force generating devices (such as, for example, springs) are connected to the drive shaft and rotation shaft to control the amount of torque applied to the actuator or valve assembly by movement of the handwheel or other device connected to the rotation shaft. Torque indicator markings integrated with the handwheel device visually indicate the amount of torque being applied to the actuator or valve assembly in relation to the movement or rotation of the handwheel or other device connected to the rotation shaft. A tattletale torque indicator for indicating the maximum amount of torque applied to an actuator or valve assembly by the handwheel device may also be incorporated with the handwheel device.

In other embodiments, the rotation shaft of a handwheel device may include lugs which compress springs or other force generating devices which in turn impart a force on a drive shaft shell. Movement of the drive shaft shell exerted by the force generating devices rotates a drive shaft and drives an actuator or valve assembly connected thereto. Torque indicator markings and tattletale torque indicators according to particular embodiments of the invention may be incorporated with such devices to indicate the amount of torque being applied to an actuator or valve assembly and to record the maximum amount of torque applied thereto over a period of time.

In still other embodiments, a handwheel device may include a drive shaft and flexible spokes connected to a handwheel or other device for rotating a drive shaft. Rotation of the handwheel flexes the spokes until sufficient torque is applied to the drive shaft to drive an actuator or valve assembly connected to the drive shaft. Torque indicator markings may be incorporated with a support connected to the drive shaft and oriented with respect to a flexible spoke. The flexing of a spoke in relation to the torque indicator markings provides a visual representation of the amount of torque being applied to an actuator or valve assembly by movement of the handwheel or other rotational device. A tattletale torque indicator may also be incorporated with the handwheel device to indicate the maximum amount of torque applied to an actuator or valve assembly being driven by the handwheel device.

According to other embodiments of the invention, a handwheel device may include force generating devices incorporated into a handwheel to exert force on rotation spokes connected to the handwheel and a drive shaft. The drive shaft may drive an actuator or a valve assembly connected to the drive shaft. Torque indicator markings incorporated with the handwheel device visually indicate the amount of torque or a range of torque being applied to the drive shaft and actuator or valve assembly by the rotation of the handwheel. A tattletale torque indicator may also be incorporated with the handwheel device to indicate a maximum torque value applied to the actuator or valve assembly by the handwheel device over a period of time.

Methods for visually monitoring the amount of torque applied to an actuator or valve assembly by a handwheel device are also provided. The incorporation of torque indicator markings with a handwheel device allows monitoring the amount of torque being applied by the handwheel device to an actuator or valve assembly.

In still other embodiments, methods for monitoring and recording the maximum amount of torque applied to an actuator or valve assembly are provided by the incorporation of a tattletale device with a handwheel device. The tattletale device may be used to monitor or determine the maximum amount of torque applied to an actuator or valve assembly over time. The tattletale device may be visually locatable or may be hidden within the handwheel device.

BRIEF DESCRIPTION OF DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

BEST MODE(S) FOR CARRYING OUT THE INVENTION

Particular embodiments of the invention relate to visual torque indicators that may be used with a valve assembly or actuator and, more particularly, to devices for indicating when the amount of torque being applied to a valve assembly or actuator exceeds the torque limits of the valve assembly or actuator.

According to embodiments of the invention, a visual representation of the amount of torque being applied to a valve assembly or an actuator by use of a handwheel may be incorporated with a handwheel assembly or as part of the valve assembly or actuator. As a handwheel assembly is rotated, the corresponding amount of torque being applied to a valve assembly or actuator by rotation of the handwheel is visually indicated by a torque indicator. The torque indicator may reflect the amount of torque being applied to the valve assembly or actuator or a range of torque that is being applied to the valve assembly or actuator. Thus, the torque indicator according to embodiments of the invention may visually inform a user whether the torque limits of the valve assembly or actuator are being, or have been, exceeded.

Figure 1:
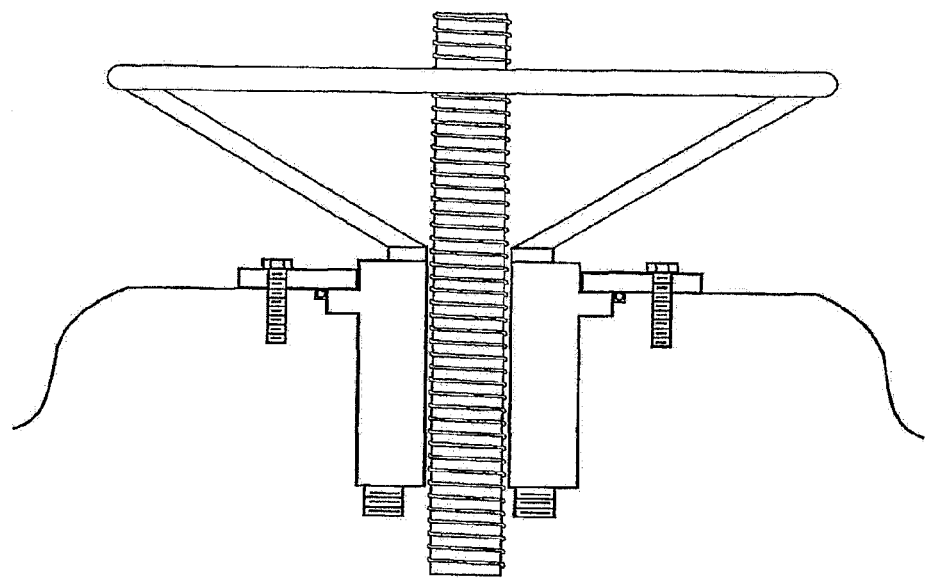
FIG. 1 illustrates a handwheel assembly as used in the prior art.
Figure 2:
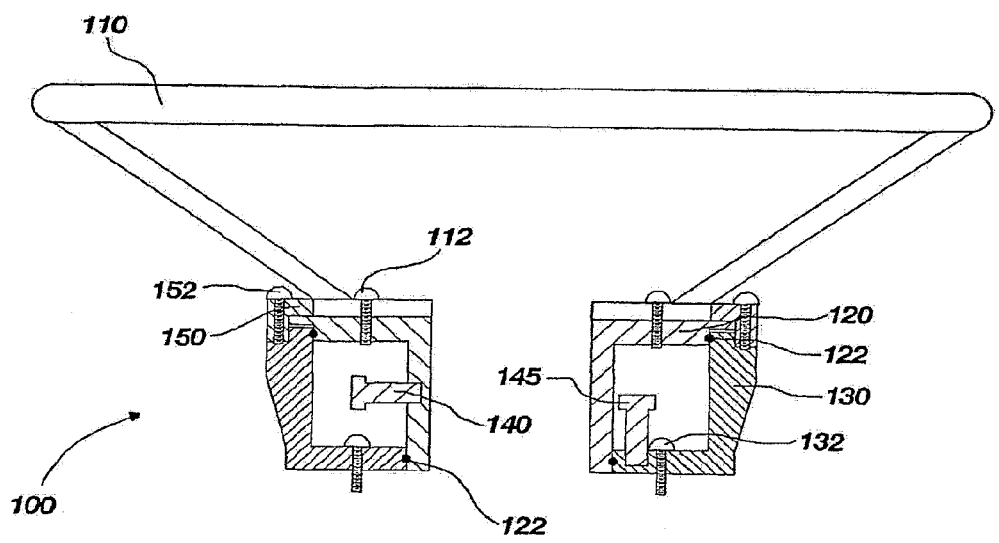
FIG. 2 illustrates a cross-sectional view of a handwheel assembly according to particular embodiments of the invention.

One particular embodiment of a handwheel device 100 that may be used with the invention is illustrated in FIG. 2. The handwheel device 100 includes a handwheel 110 removably fixed to a rotation shaft 120 by one or more bolts 112. The rotation shaft 120 may be located inside a drive shaft 130 and may be rotated therein. A handwheel cap 150 may be connected to the drive shaft 130 by one or more bolts 152 to secure the rotation shaft 120 within the drive shaft 130. Additionally, one or more moveable seals or bearings 122 may be positioned between the rotation shaft 120 and the drive shaft 130 to facilitate rotational movement of the rotation shaft 120 within the drive shaft 130. The drive shaft 130 may be removably fixed to an actuator or a valve assembly by bolts 132 to impart movement to the actuator or valve assembly as the drive shaft 130 is rotated. The handwheel device 100 also includes one or more rotation pegs 140 connected to the rotation shaft 120 and one or more drive pegs 145 connected to the drive shaft 130.

According to certain embodiments of the invention, the handwheel device 100 may be equipped with a torque indicator to visually indicate the amount of torque being applied to the drive shaft 130 and to the actuator or valve assembly connected to the drive shaft 130.

Figure 3:
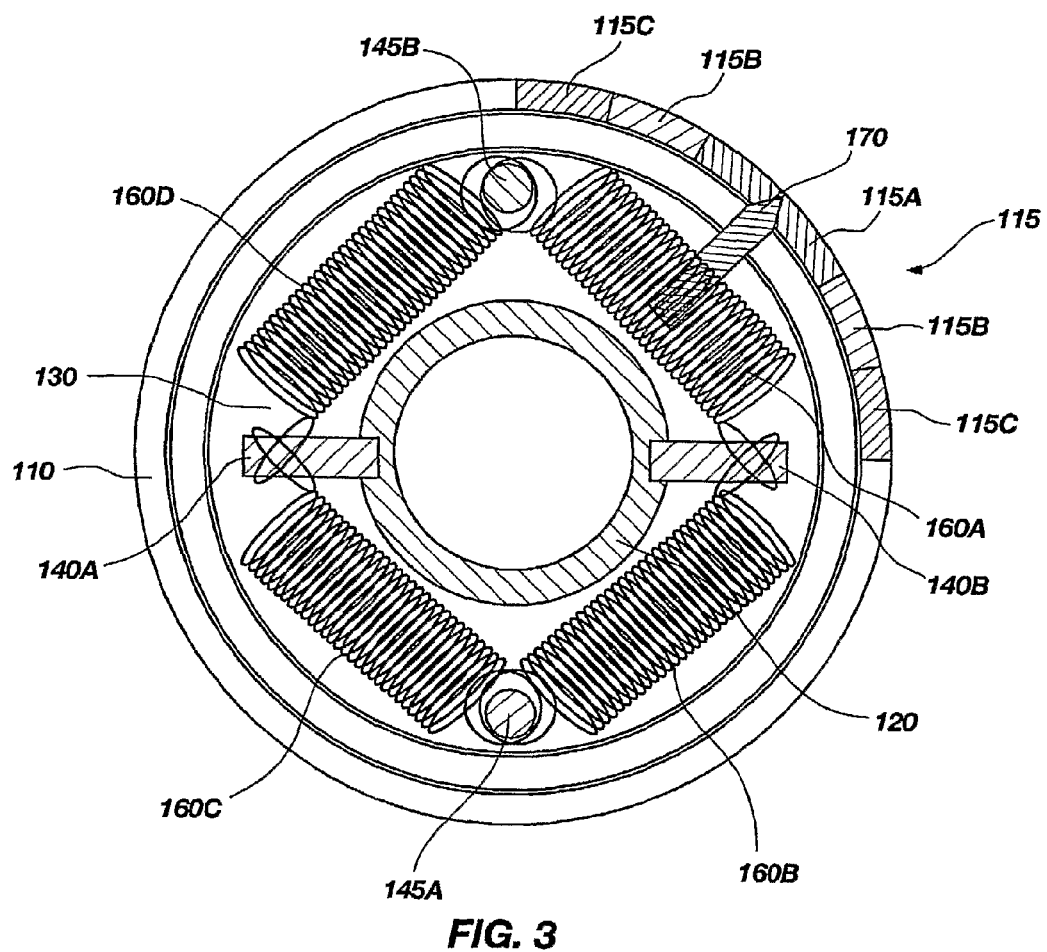
FIG. 3 illustrates a top-down view of a handwheel assembly according to particular embodiments of the invention.

A torque indicator, according to some embodiments of the invention, is illustrated in FIG. 3. A handwheel device 100, such as that illustrated in FIG. 2, includes torque indicator markings 115 on the handwheel 110, a pointer 170 mounted to the drive shaft 130, and one or more springs 160 having two ends, the springs being removably connected by a first end to a rotation peg 140 and by a second end to a drive peg 145. The torque indicator illustrated in FIG. 3 includes two rotation pegs 140A and 140B and two drive pegs 145A and 145B. At least one spring 160 can be connected to the peg(s), with spring(s) 160 being connected between rotation peg(s) 140 and drive peg(s) 145.

The drive shaft 130 of the handwheel device 100 may be rotated by the handwheel 110. Movement of the handwheel 110 rotates the rotation shaft 120 which, in turn, moves the rotation pegs 140 fixed to the rotation shaft 120. Movement of the rotation pegs 140 impart a force on one or more springs 160 which, in turn, stretch and impart a force on the drive pegs 145. If the force imparted on the drive pegs 145 is sufficient to move the drive shaft 130, the drive shaft 130 moves with the rotation of the handwheel 110. However, if the torque or force required to rotate the drive shaft 130 is greater than the force being applied to the handwheel 110, then the drive shaft 130 will not move. The application of additional force to the handwheel 110 will further stretch the springs 160, imparting a larger force on the drive shaft 130. In this manner, the handwheel 110 may be rotated until enough force is applied by the springs 160 to the drive pegs 145 to rotate the drive shaft 130 in the same direction as the handwheel 110 rotation.

For example, when the handwheel 110 illustrated in FIG. 3 is rotated in a clockwise direction, rotation pegs 140A and 140B also move in a clockwise direction, stretching springs 160C and 160A, respectively. The stretching of springs 160A and 160C imparts a force on the drive pegs 145B and 145A, respectively. For instance, as spring 160A is stretched by the movement of rotation peg 140B, the spring 160A exerts a pulling force on drive peg 145B. Similarly, the stretching of spring 160C by rotation of rotation peg 140A exerts a pulling force on drive peg 145A. If the forces applied by spring 160A to drive peg 145B and by spring 160C to drive peg 145A are sufficient to overcome the force required to rotate drive shaft 130, then the drive shaft 130 will rotate. However, if the spring 160 forces are not sufficient to overcome the force required to move the drive shaft 130, then additional rotational force must be applied to the handwheel 110 before rotation of the drive shaft 130 will occur.

As illustrated in FIG. 2, the drive shaft 130 is attached to an actuator or a valve assembly by bolts 132. Actuators and valve assemblies typically have a maximum torque tolerance. If the torque tolerance is exceeded, damage to the actuator or valve assembly may occur. Therefore, the amount of torque applied to a drive shaft 130 preferably does not exceed the torque limits of the actuator or valve assembly to which it is attached. In the previous example, if the drive shaft 130 does not begin to rotate due to rotation of the handwheel 110, an operator may be tempted to continue to apply additional rotational force to the handwheel 110 which, in turn, applies torque to the drive shaft 130 and the actuator or valve assembly to which it is attached.

As illustrated in FIG. 3, particular embodiments of the invention include torque indicator markings 115 on the handwheel 110 and a pointer 170 attached to the drive shaft 130. When used in combination, the torque indicator markings 115 may be aligned with the pointer 170 to indicate the amount of torque being applied to an actuator or valve assembly attached to the drive shaft 130. By way of example and not limitation, the torque indicator markings 115 on handwheel 110 in FIG. 3 include three regions. A first region 115A may be aligned with the pointer 170 such that the pointer 170 is positioned in the middle of the first region 115A when no forces are being applied to the handwheel 100 and drive shaft 130. Two second regions 115B lie on either side of the first region 115A and are equally sized and spaced. Two third regions 115C lie on either side of the two second regions 115B and are also equally sized and spaced. As the handwheel 110 is rotated, the torque indicator markings 115 move with the handwheel 110 and in relation to the position of the pointer 170. If the rotational forces applied to the handwheel 110 are insufficient to move the drive shaft 130, the pointer 170 will remain in its starting position but will point to a different portion of the torque indicator markings 115, depending upon how much rotation has been applied to the handwheel 110. Once sufficient force is applied to the handwheel 110 to rotate the drive shaft 130, the drive shaft 130 will rotate and move the pointer 170. The movement of the pointer 170 will depend on the movement of the handwheel 110 and the pointer 170 will indicate the amount of torque that is being applied to move the drive shaft 130 by its position relative to the torque indicator markings 115 on the handwheel 110.

According to some embodiments of the invention, the torque indicator markings 115 may be color coded. For example, the three different torque indicator marking 115 regions illustrated in FIG. 3 may be color coded to visually indicate when the torque limits of an actuator or a valve assembly attached to the drive shaft 130 are being approached or exceeded. The first region 115A may be colored green to indicate that operation of the handwheel 110 in the first region 115A is within the bounds of acceptable torque limits for the actuator or valve assembly connected to the drive shaft 130. The second regions 115B may be colored yellow to indicate that the torque limits of the actuator or valve assembly attached to the drive shaft 130 are being approached. The third regions 115C may be colored red to indicate that the torque limits of the actuator or valve assembly attached to the drive shaft 130 have been or are being exceeded.

According to other embodiments of the invention, the torque indicator markings 115 may include other series of markings. For example, markings representing units or numbers associated with the amount of torque being applied to a drive shaft 130 may be used as the torque indicator markings 115. Alternatively, other markings may also be used and embodiments of the invention are not limited by the type or style of torque indicator markings 115 used.

During operation, the amount of torque being applied to the drive shaft 130 and to the connected actuator or valve assembly can be monitored when the handwheel 110 is turned. As the handwheel 110 is rotated, the pointer 170 remains in a fixed position until sufficient torque is applied to the drive pegs 145 by rotation of the handwheel 110, resulting in movement of the drive shaft 130. The movement of the handwheel 110 aligns the torque indicator markings 115 with the pointer 170. If the drive shaft 130 begins to move while the pointer 170 is still in the first region 115A (i.e., the green zone), the pointer will remain in the first region 115A until additional force is applied to move the drive shaft 130. As additional force is applied to move the drive shaft 130, the pointer may not move in synchronization with the handwheel 110, thus the pointer 170 may move from the first region 115A into the second region 115B, indicating that the torque limits of the actuator or valve assembly attached to the drive shaft 130 are being approached. Thus, the operator is able to visually judge whether or not additional torque should be applied to the actuator or valve assembly by viewing where the pointer is located in relation to the torque indicator markings 115 on the handwheel 110.

The torque limits of the actuator or valve assembly to which the drive shaft 130 is attached are typically known. According to particular embodiments of the invention, the ranges of torque being applied to the drive shaft 130 by rotation of the handwheel 110 may be adjusted by changing the springs 160 attached to the rotation pegs 140 and drive pegs 145. If a larger amount of torque is required to move an actuator or valve assembly, stronger springs 160 may be used with embodiments of the invention. If a smaller amount of torque is required to move an actuator or valve assembly, smaller springs 160 may be used. The springs 160 used with embodiments of the invention may be selected based upon the operational torque ranges that may be applied to an actuator or valve assembly and the size of the regions of the torque indicator markings 115 on the handwheel 110. For example, knowing the operational torque limits of an actuator attached to the drive shaft 130, a spring 160 or set of springs 160 may be selected such that the springs 160 will move the drive shaft 130 while the torque indicator markings 115 of the first region 115A correspond to the pointer 170 position on the drive shaft 130. The springs 160 may also be selected such that, as the torque limits of the actuator are being approached, the amount of rotation of the handwheel 110 required to move the drive shaft 130 will correspond to movement of the pointer 170 into the second region 115B of the torque indicator markings 115. Similarly, the springs 160 may be selected such that, when the torque limits are exceeded, the pointer 170 will correspond to the third region 115C of the torque indicator markings 115.

Some embodiments of the invention, such as those illustrated in FIG. 3, may be used to warn an operator of a handwheel device 100 when the torque limits of an actuator or valve assembly connected to the handwheel device 100 are being approached or are being exceeded. By visually inspecting the position of a pointer 170 relative to a torque indicator marking 115 on the handwheel 110, the amount of torque relative to the torque limits of an actuator or valve assembly may be determined and decisions regarding the operation of the handwheel device 100 with respect to the actuator or valve assembly may be made.

Figure 4:
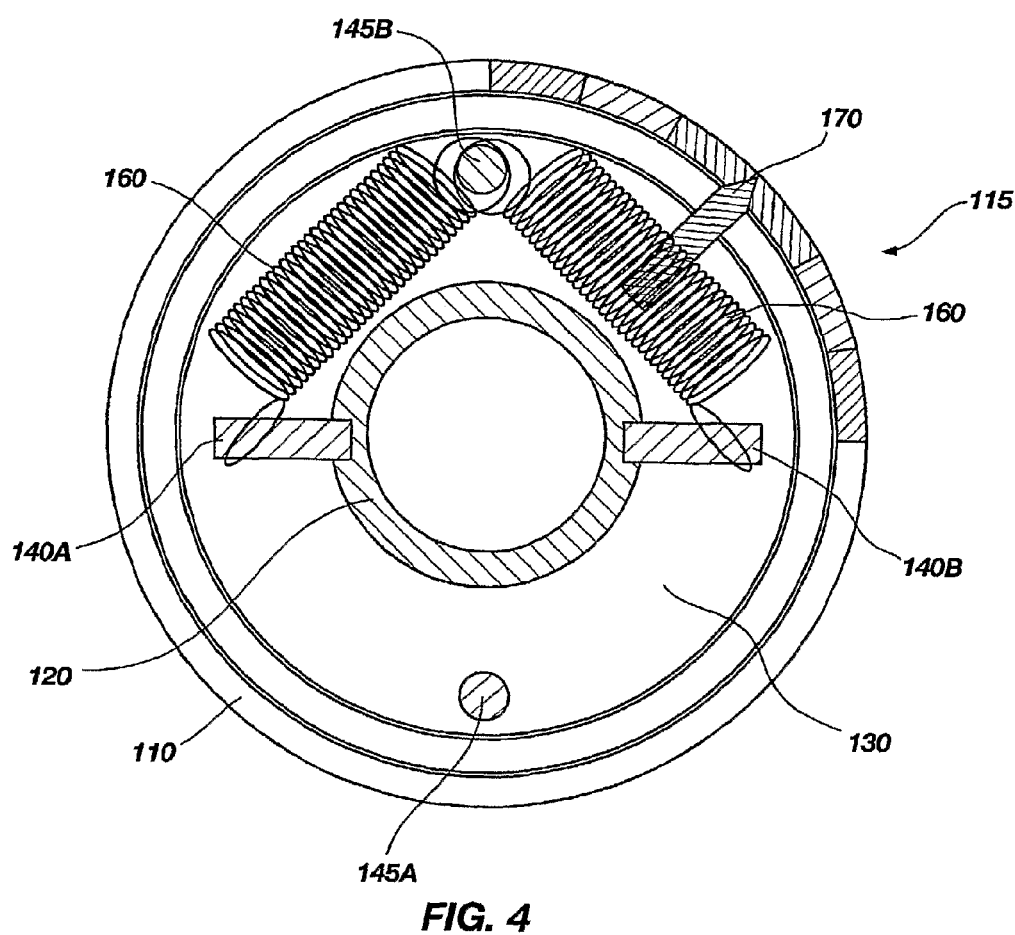
FIG. 4 illustrates a top-down view of a handwheel assembly according to certain embodiments of the invention.

According to some embodiments of the invention, the number of springs 160 used with a handwheel device 100 may vary. As illustrated in FIG. 3, four springs 160 could be used. As illustrated in FIG. 4, two springs may be used and may be configured such that each spring 160 is connected to the same drive peg 145B and respectively connected to opposite rotation pegs 140. In other embodiments, two springs may be used and may be set opposite of each other (not shown) such that a first spring 160 is connected to a first drive peg 145A and a first rotation peg 140A and a second spring 160 is connected to a second drive peg 145B and a second rotation peg 140B. Use of one spring 160 or three springs 160 may also be adopted with embodiments of the invention. In still other embodiments, multiple springs 160 may be connected in series, in parallel, or both, to the drive pegs 145 and rotation pegs 140 to create sufficient rotational force necessary for operation of the handwheel device 100 with an actuator or a valve assembly.

Springs 160 may also be replaced by, or used in combination with, other devices capable of imparting similar forces to those of the springs 160 when the handwheel device 100 is operated. For instance, cords made of stretchable materials such as rubber, fabric or the like may be used with the present invention. As an example, a series or group of elastic or bungee-type cords may be substituted for a spring 160 and attached to the drive pegs 145 and rotation pegs 140 to impart the equivalent forces created by a spring 160. Any other known materials and devices suitable to create such forces could also be used.

In additional embodiments, springs 160 or other devices capable of imparting forces used with embodiments of the invention may be connected to a drive shaft 130 and rotation shaft 120 by any suitable devices or methods (other than by drive pegs 145 and rotation pegs 140) capable of being connecting or holding springs 160 or other equivalent devices.

According to other embodiments of the invention, the torque indicator markings 115 may be applied to the drive shaft 130 of the handwheel device 100 and the pointer 170 may be attached to the handwheel 110 (not shown). In such embodiments, the pointer 170 moves relative to the drive shaft 130 as the handwheel 110 is rotated, thereby indicating the range of torque being applied to the drive shaft 130 and to an actuator or valve assembly connected to the drive shaft 130. As the drive shaft 130 begins to move, the pointer 170 will maintain alignment with the portion of the torque indicator markings 115 on the drive shaft 130, thus indicating whether the amount of torque being applied by rotation of the handwheel 110 is within an acceptable range for the actuator or valve assembly connected to the drive shaft 130.

According to other embodiments of the invention, the torque indicator markings 115 may be integrated with the rotation shaft 120 and the pointer 170 integrated with the drive shaft 130. In still other embodiments, the torque indicator markings 115 may be integrated with the drive shaft 130 and the pointer 170 integrated with the rotation shaft 120.

According to other embodiments of the invention, a "tattletale" device may be used alone or in combination with the torque indicating device. The tattletale device is capable of indicating whether the torque limits of the actuator or valve assembly attached to the handwheel device 100 have been exceeded by rotation of the handwheel 110. Any number of tattletale devices may be incorporated with various embodiments of the invention. Thus, the embodiments described herein are merely representative and are not intended to be limiting.

In some embodiments of the invention, a pointer 170 may make contact with the torque indicator markings 115. As the pointer 170 moves along the area of the torque indicator markings 115, the pointer 170 may leave a mark indicating the maximum deflection of the pointer 170 with respect to the torque indicator markings 115. The mark may be a permanent mark, such as by scoring the torque indicator markings 115 or otherwise marking them so that visual inspection of the torque indicator markings 115 reveals the maximum amount of torque, or a maximum range of torque, applied to an actuator or valve assembly attached to a drive shaft 130 of a handwheel device 100.

In other embodiments, the pointer 170 may move a hidden tattletale incorporated with the torque indicator markings 115. For example, torque indicator markings 115 placed on a handwheel 110 or on a drive shaft 130 may include a device having an interior cavity wherein one or more moveable markers may be placed for movement within the cavity. The markers may be oriented, upon assembly and placement of the torque indicator markings 115 on the handwheel device 100, such that the markers are in line with a zero torque position, or within the normal operational torque zone. Movement of a pointer 170 with respect to the markers may move the markers in one direction within the cavity such that the markers record the maximum deflection of the pointer 170 along the torque indicator markings 115. For instance, one or both of the markers and pointer 170 may be magnetized such that movement of the pointer 170 imparts a corresponding movement to a marker. Therefore, to determine if the maximum torque limits of the actuator or valve assembly connected to the handwheel device 100 had been exceeded, the torque indicator marking 115 device could be disassembled to determine the position of the markers in the cavity.

In still other embodiments of the invention, movement of the pointer 170 along the torque indicator markings 115 would push one or more pins or secondary pointers attached to the torque indicator markings 115 which would mark the maximum torque position reached along the torque indicator markings 115. Inspection of the pin or pins would reveal the maximum torque range reached for the device during operation.

In other embodiments of the invention, the tattletale device may be hidden such that the maximum deflection, as recorded by the tattletale device, may only be determined by disassembling the handwheel device 100. For example, a tattletale device may be placed on the interior of the handwheel device 100. One or more moveable pins positioned within an interior space of the handwheel device 100 may be associated with torque indicator markings 115 and may be moved by the movement of the pointer 170. As the pointer is deflected over the torque indicator markings 115, one or more moveable pins could be moved to reflect the maximum torque exerted on the handwheel device 100.

According to other embodiments of the invention, the tattletale device may include a crushable material that would be permanently deformed as greater pointer 170 deflections occurred along the torque indicator markings 115. The position of the deformed, crushable material in relation to the torque indicator markings 115 reflect the maximum amount of torque applied to the drive shaft 130 by the handwheel device 100.

The use of tattletale devices with embodiments of the present invention allow an operator of a handwheel device 100 to visually determine when the torque limits of an actuator or valve assembly have been exceeded, which would indicate whether maintenance or replacement of the equipment is needed. Additionally, the use of tattletales, and especially hidden tattletales, may allow manufactures to determine when the torque limits of a damaged actuator had been exceeded so that the manufacturer could avoid warranty and other liabilities.

Figure 5:
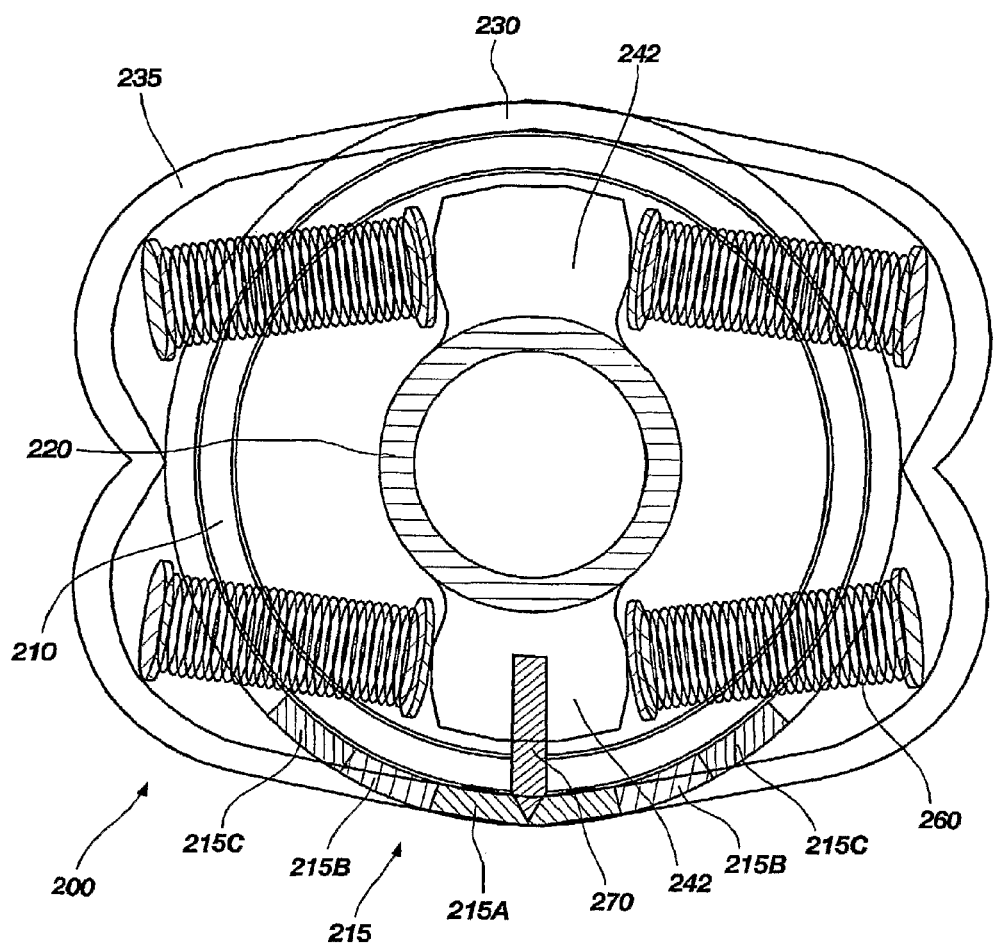
FIG. 5 illustrates a top-down view of a handwheel assembly according to some embodiments of the invention.
Figure 6:
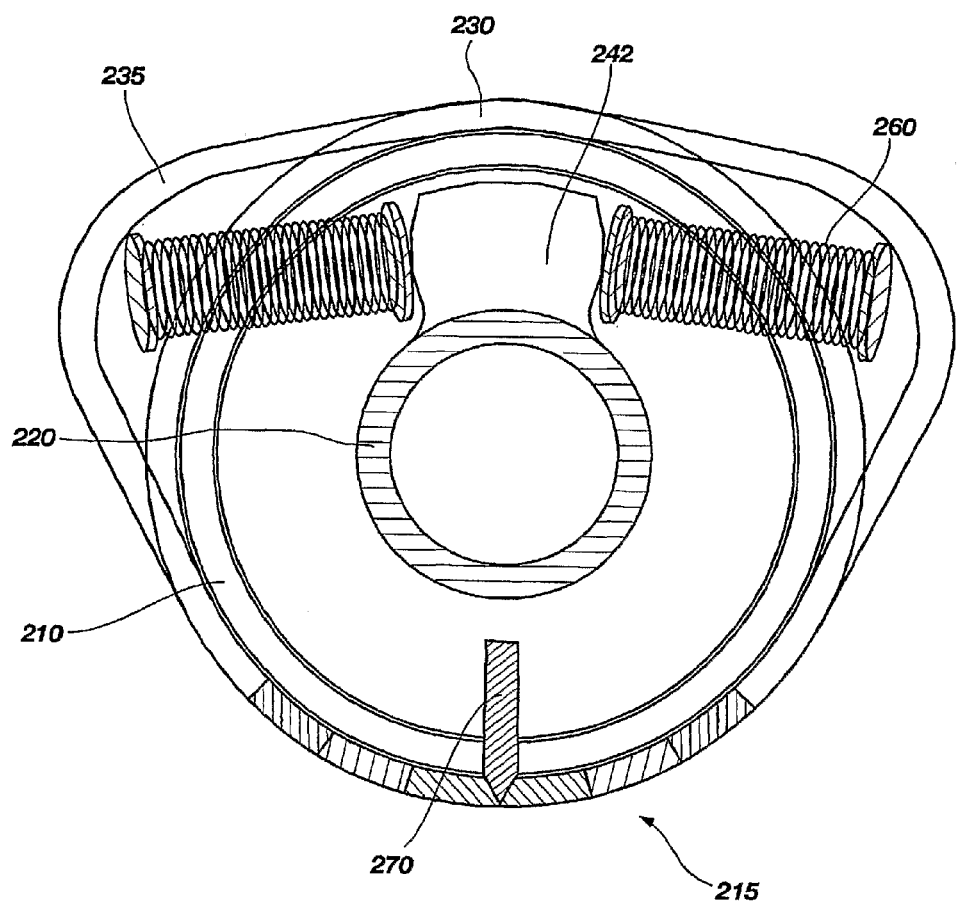
FIG. 6 illustrates a top-down view of a handwheel assembly according to particular embodiments of the invention.

Other representative embodiments of the invention are illustrated in FIGS. 5 and 6. As illustrated in FIG. 5, the drive shaft 230 includes a drive shaft shell 235 connected to the drive shaft 230 and a group of compression springs 260 in communication with the drive shaft shell 235. The compression springs 260 are also in communication with lugs 242, which are in turn connected to the rotation shaft 220. A handwheel 210 is connected to the rotation shaft 220 and may be used to rotate the rotation shaft 220 in the direction that the handwheel 210 is turned, as with other embodiments of the invention. Rotation of the shaft 220 moves the lugs 242, resulting in compression of one or more springs 260 and application of pressure to the drive shaft shell 235. When the force exerted on the compression springs 260 by rotation of the handwheel 210 is sufficient to overcome the torque required to move the drive shaft 230, the compression springs 260 cause movement of the drive shaft shell 235 and the drive shaft 230 connected thereto. Movement of the drive shaft 230 translates to movement of an actuator or valve assembly connected to the drive shaft 230 (not shown).

Similar to other embodiments of the invention, the handwheel device 200 illustrated in FIG. 5 includes torque indicator markings 215 and a pointer 270. The torque indicator markings 215 include a first region 215A, two second regions 215B on either side of the first region 215A, and two third regions 215C on either side of the second regions 215B. The torque indicator markings 215 illustrated in FIG. 5 are attached to or associated with the drive shaft 230. It is understood that the torque indicator markings 215 may also be associated with the handwheel 210, the drive shaft shell 235, or the rotation shaft 220, as previously described with reference to other embodiments of the invention. Similarly, it is understood that the pointer 270 may be associated with the rotation shaft 220, the drive shaft 230, the drive shaft shell 235, or the handwheel 210 of the handwheel device 200. As illustrated, the pointer 270 is connected to a lug 242 or to the rotation shaft 220.

When the handwheel 210 of the handwheel device 200 illustrated in FIG. 5 is rotated, the pointer 270 moves with the rotation shaft 220 and with respect to the torque indicator markings 215, indicating the amount of torque being applied to the drive shaft 230 by the compression springs 260. When sufficient torque is applied to the drive shaft shell 235, the drive shaft shell 235 moves the drive shaft 230, which in turn, moves the torque indicator markings 215. The position of the pointer 270 in relation to the torque indicator markings 215 during rotation visually represents the amount of torque being applied to the drive shaft 230 and the actuator or valve assembly connected to the drive shaft 230.

The drive shaft shell 235 may include other configurations. For example, the handwheel device 200 illustrated in FIG. 6 can include a drive shaft shell 235 having a different configuration than the drive shaft shell 235 of FIG. 5. According to alternative embodiments of the invention, the drive shaft shells 235 may be configured to accommodate the positioning of compression springs 260 within the drive shaft shell 235 such that lugs 242 apply forces to the compression springs 260 and to the drive shaft shell 235.

According to particular embodiments of the invention, any number of compression springs 260 may be used with the different configurations of handwheel devices 200. For example, four compression springs 260 are shown in FIG. 5 and two compression springs 260 are shown in FIG. 6. Although not illustrated, one or three compression springs 260 could also be used with other embodiments of the invention and the drive shaft shells 235 could be configured appropriately. In still other embodiments, multiple compression springs 260 could be combined in series, in parallel, or in both series and parallel arrangement to provide the necessary resistance or forces required to rotate the drive shaft 230 of a handwheel device 200. In addition, other types of springs, such as Belleville springs, could be used in place of the compression springs 260. Also, other materials, such as stretchable materials and bungee-cord type materials, could be used in place of, or in combination with, the compression springs with the various embodiments of the present invention.

In still other embodiments of the invention, a tattletale device may be included with the handwheel devices 200 illustrated in FIGS. 5 and 6. The tattletale device may include a visual indication of the maximum torque reached during use of the handwheel device 200, such as, for example, by a movable pin that indicates the maximum torque position or contact between the pointer 270 and the torque indicator markings 215, which leaves a visual mark on the torque indicator markings 215. Hidden tattletale devices may also be used with embodiments of the invention, where the hidden tattletale devices are enclosed in the handwheel device 200 such that inspection of the maximum torque indicating tattletale may only be performed by disassembling the handwheel device 200. The tattletale devices that may be used with embodiments of the invention, such as those illustrated in FIGS. 5 and 6, are not limited and may include any tattletale device that can be used with other embodiments of the invention.

Figure 7:
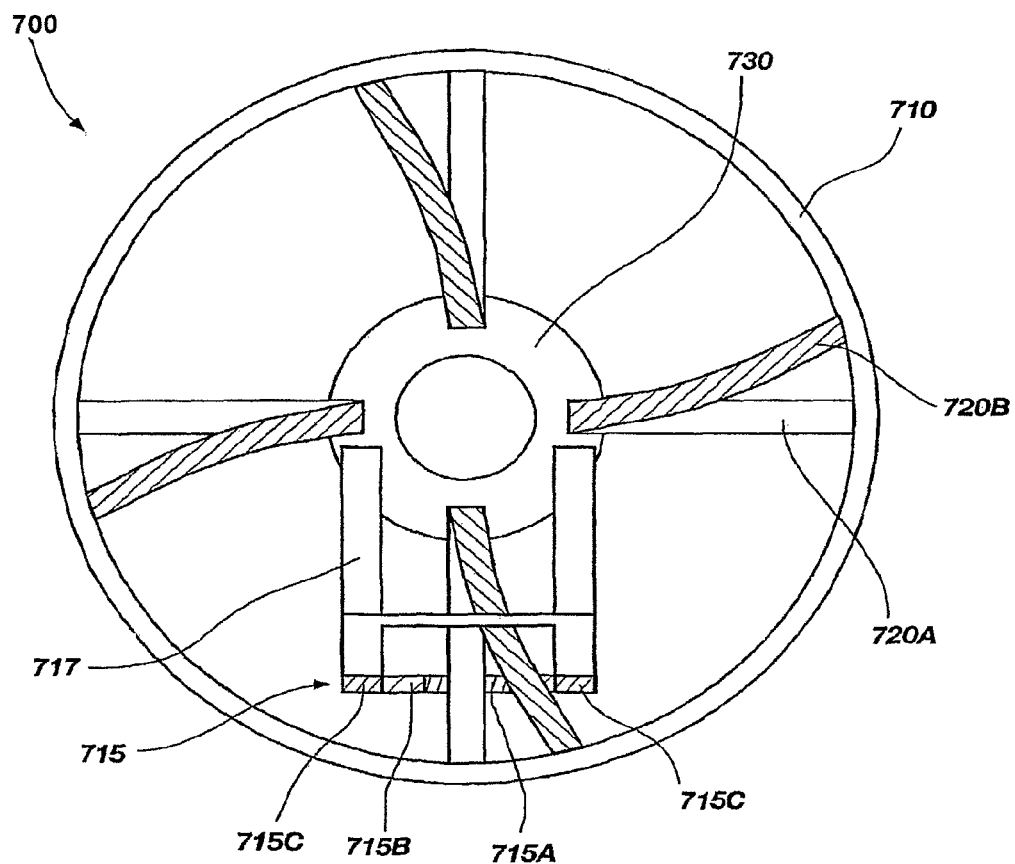
FIG. 7 illustrates a top-down view of a handwheel assembly according to certain embodiments of the invention.

FIG. 7 illustrates additional embodiments of the invention. As illustrated, a handwheel device 700 may include a handwheel 710, flexible spokes 720, a drive shaft 730, and torque indicator markings 715 mounted to a torque indicator support 717. One or more flexible spokes 720 are connected on a first end to the handwheel 710 and on a second end to the drive shaft 730. Rotation of the handwheel 710 translates force through the flexible spokes 720 to the drive shaft 730, which in turn rotates the drive shaft 730. The drive shaft 730 may be attached to an actuator or a valve assembly. A torque indicator support 717 may be connected to the drive shaft 730 and may span one or more of the flexible spokes 720. The torque indicator support 717 supports torque indicator markings 715 which may be used to determine when the amount of torque being applied to the handwheel 710 exceeds the torque limits of an actuator or valve assembly connected to the drive shaft 730.

As illustrated in the embodiment of FIG. 7, the torque indicator markings 715 may include three different regions: a first region 715A, two second regions 715B on either side of the first region 715A, and two third regions 715C on either side of the two second regions 715B. The torque indicator markings 715 may be color coded to indicate the different regions or ranges of torque being applied to a drive shaft 730 by rotation of a handwheel 710. According to other embodiments of the invention, the torque indicator markings 715 may include one or more markings capable of indicating differing amounts of torque that are being applied to an actuator or valve assembly attached to a drive shaft 730.

Other markings or marking combinations may be used as torque indicator markings 715 according to other embodiments of the invention.

The flexible spokes 720 may be disposed or placed in a relaxed position 720A when no rotational forces are applied to the handwheel 710, as illustrated in FIG. 7. However, when the handwheel 710 is rotated, the applied forces cause the flexible spokes 720 to bend into a flexed position 720B. When the rotational force placed on the flexible spokes 720 by the handwheel 710 is released, the flexible spokes 720 return to the relaxed position 720A.

The amount of torque being applied to the drive shaft 730, and to an actuator or valve assembly connected to the drive shaft 730, may be determined by the position of a flexible spoke 720 in the flexed position 720B caused by a rotation of the handwheel 710. As illustrated in FIG. 7, when a rotational force is applied to the handwheel 710, the flexible spokes 720 bend into a flexed position 720B. The torque indicator support 717, however, moves with the drive shaft 730. Therefore, until the drive shaft 730 begins to move, the torque indicator support 717 remains in position and the amount of torque being applied to the drive shaft 730 may be determined by looking at the position of the flexed spoke 720B in relation to the torque indicator markings 715 held by the torque indicator support 717. When the drive shaft 730 moves, the torque indicator markings 715 and the torque indicator support 717 also move, and the amount of torque being applied to the drive shaft 730 and an actuator or valve assembly attached thereto can be determined by the position of the flexed spoke 720B in reference to the torque indicator markings 715.

In some embodiments of the invention, the handwheel device 700 illustrated in FIG. 7 may also include a tattletale device (not shown). The tattletale device may record the maximum amount of torque applied to the drive shaft 730 and the actuator or valve assembly attached thereto. For example, the flexible spokes 720 may contact the torque indicator markings 715 such that the flexible spokes 720 leave a mark on the torque indicator markings 715 corresponding to the maximum amount of torque applied to the handwheel device 700. In other embodiments, the movement of the flexible spokes 720 may move a pin or other marker associated with the torque indicator markings 715 such that the maximum applied torque may be visually indicated on the torque indicator markings 715. Tattletale devices used with and according to other embodiments of the invention may also be used with the handwheel device 700 illustrated in FIG. 7.

Figure 8:
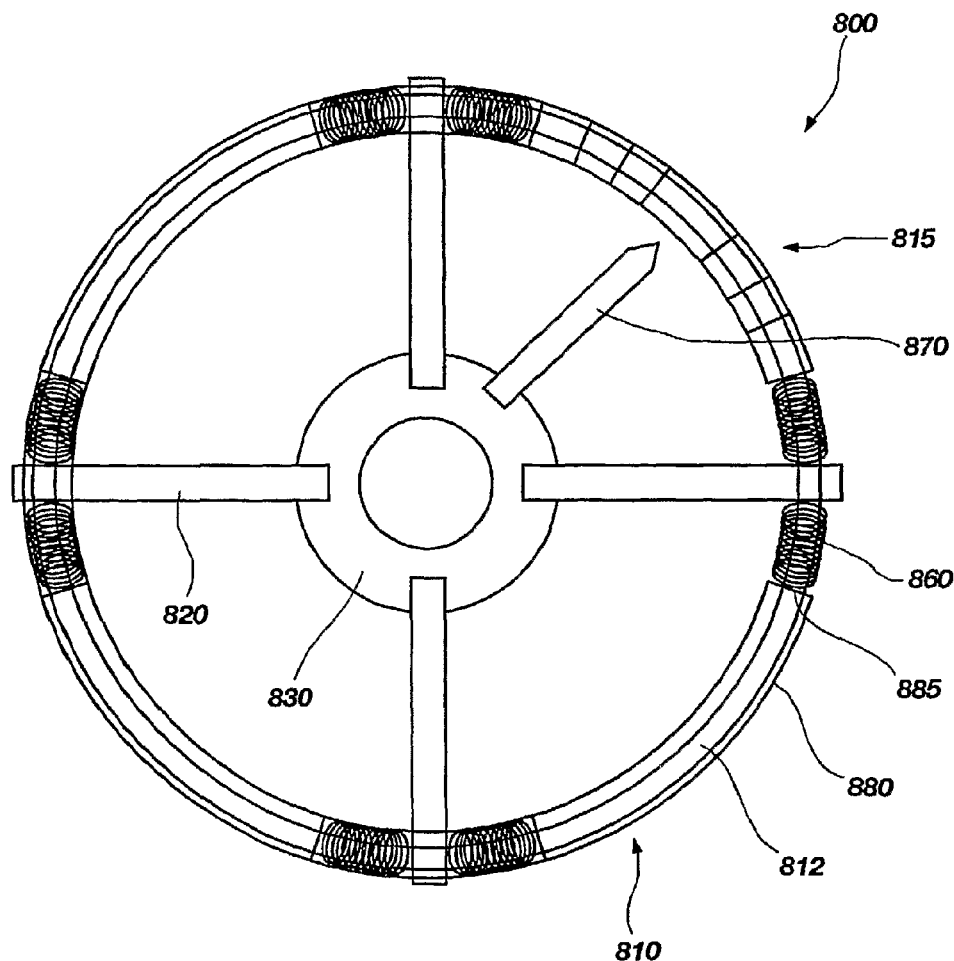
FIG. 8 illustrates a top-down view of a handwheel assembly according to some embodiments of the invention.

According to yet another embodiment of the invention, a handwheel device 800 may include a handwheel 810, a drive shaft 830, and one or more drive spokes 820 connecting the handwheel 810 to the drive shaft 830, as illustrated in FIG. 8. The drive shaft 830 may be connected to an actuator or a valve assembly. The handwheel 810, may further include a handwheel rim 812 and a handwheel cover 880 wrapped around one or more portions of the handwheel rim 812. Springs 860 can be mounted around the handwheel rim 812 next to one or more of the drive spokes 820. As illustrated in FIG. 8, springs 860 may be mounted on the handwheel rim 812 on either side of each of the drive spokes 820. Springs 860 may include compression springs, Belleville springs, or any other suitable devices capable of providing a force necessary to operate embodiments of the invention. A slotted handwheel cover 880 may fit over the handwheel rim 812 and contact the springs 860 at a spring drive position 885.

Figure 9:
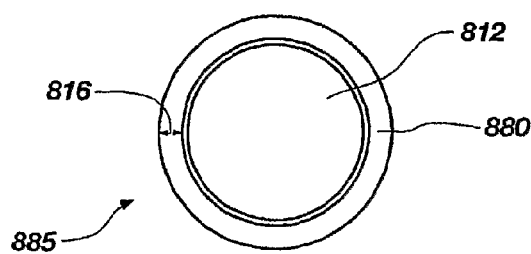
FIG. 9 illustrates a cross-sectional view of a handwheel rim that may be used with certain embodiments of the invention.

In some embodiments of the invention, the spring drive position 885 portion of the handwheel cover 880 can include a cross-sectional opening, allowing passage of the handwheel rim 812 but preventing passage of the springs 860. FIG. 9 illustrates a cross-sectional view of the handwheel rim 812 and handwheel cover 880 at one of the spring drive positions 885 of the handwheel 810. As illustrated, the handwheel rim 812 is encompassed by the handwheel cover 880 and the handwheel cover 880 includes a width 816 at the spring drive position 885. The width 816 of the handwheel cover 880 at the spring drive position 885 can be adapted to prevent movement of a spring 860 with the handwheel rim 812. In other words, the width 816 portion of the handwheel cover 880 can be adapted to apply a force to a spring 860 mounted to the handwheel rim 812.

In some embodiments, the handwheel rim 812 can be configured such that it passes through the one or more drive spokes 820 and is moveable through the drive spokes 820. In such embodiments, the handwheel cover 880 is fixed to the handwheel rim 812 such that movement of the handwheel cover 880 translates into similar movement of the handwheel rim 812. Therefore, rotation of the handwheel cover 880 translates into rotation of the handwheel rim 812. As the handwheel cover 880 is rotated, the handwheel rim 812 moves and the spring drive positions 885 of the handwheel cover 880 apply a force to one or more of the springs 860, which in turn apply a force to one or more of the drive spokes 820. If the force applied by one or more springs 860 to the drive spokes 820 is sufficient to rotate the drive shaft 830, the drive spokes 820 will move and cause a rotation of the drive shaft 830.

In other particular embodiments of the invention, the handwheel rim 812 can be connected to the one or more drive spokes 820. In such embodiments, the handwheel cover 880 is moveable around the handwheel rim 812, whereby movement of the handwheel cover 880 does not necessarily translate to movement of the handwheel rim 812. For example, the handwheel cover 880 may slide over the handwheel rim 812 when grasped and moved. Movement of the handwheel cover 880, however, applies forces to one or more of the springs 860 in contact with the spring drive positions 885 of the handwheel cover 880. If the forces applied to one or more of the springs 860 are sufficient to overcome the torque necessary to move the drive shaft 830, the drive spokes 820 and the handwheel rim 812 will move as a result of the movement of the handwheel cover 880.

According to other embodiments of the invention, the amount of torque being applied by the handwheel 810 to the drive shaft 830 may be monitored using torque indicator markings 815. For example, in some embodiments of the invention, torque indicator markings 815 may be printed on the handwheel cover 880, as illustrated in FIG. 8. A pointer 870 may be mounted to the drive shaft 830 such that when no forces are being applied to the handwheel 810, the pointer 870 is located in a center portion of the torque indicator markings 815. As the handwheel cover 880 is rotated, the torque indicator markings 815 move relative to the pointer 870, thereby registering the amount of torque being applied to the drive shaft 830. When sufficient torque has been created to move the drive shaft 830, the pointer 870 can move with the drive shaft 830 and the handwheel cover 880, thus registering the amount of torque being applied to the drive shaft 830.

In other embodiments of the invention, torque indicator markings 815 may be located on a portion of the handwheel cover 880 overlying the springs 860 (not shown). The torque indicator markings 815 may include any type of marking desired. For example, instead of a pointer 870, one or more of the drive spokes 820 of the handwheel device 800 can be used with the torque indicator markings 815 to determine the amount of torque being applied to the drive shaft 830 and an actuator or valve assembly connector thereto. The torque indicator markings 815 located on a portion of the handwheel cover 880 covering the springs 860 about a drive spoke 820 will move in conjunction with the handwheel cover 880. As the handwheel cover 880 is moved, the relative position of the torque indicator markings 815 on the handwheel cover 880 change with respect to the drive spoke 820 over which they were originally positioned. Based upon the relative change in position, the amount of torque being applied to the drive shaft 830 may be determined. In this manner, an operator may visually register whether the torque limits of the drive shaft 830 and the actuator or valve assembly connected thereto are being approached or exceeded.

Tattletale devices may also be incorporated with embodiments of the invention illustrated in FIG. 8 or with other similar configurations. For example, a tattletale device such as a crushable material may be placed inside of the handwheel cover 880 next to a spring 860. As the handwheel 810 is moved and torque is applied, the crushable material may be permanently deformed. Examination of the extent to which the crushable material is deformed may indicate the amount of force that was applied to the material such that it can be determined whether the torque limits of the drive shaft 830 were exceeded. Other tattletale devices, such as those described with respect to other embodiments of the invention, may also be employed.

According to still other embodiments of the invention, the springs or other force-generating devices used with embodiments of the present invention may be configured such that two or more torque limits may be visually monitored using torque indicator markings according to the present invention. For example, embodiments of the invention illustrated in FIG. 3 may include four springs 160. As the handwheel 310 is rotated in a clockwise direction; springs 160A and springs 160C can be stretched between the rotation pegs 140 and the drive pegs 145. The amount of torque being applied is therefore dependent upon the strength of springs 160A and 160C, and not on springs 160B and 160D, which do not drive the drive shaft 130 when the handwheel 110 is moved in a clockwise direction. Springs 160B and 160D do, however, drive the drive shaft 130 when the handwheel 110 is moved in a counter-clockwise direction. Therefore, the forces required to move the drive shaft 130 using the handwheel 110 may be controlled by selecting the desired strength of opposing springs. If the amount of force required to move a handwheel 110 in a clockwise direction is greater than that required to move it in a counterclockwise direction, springs or other force-generating devices of different strengths can be selected. In such instances, two pointers 170 and two sets of torque indicator markings 115 may be used.

Having thus described certain currently preferred embodiments of the present invention, it is understood that the invention defined by the appended claims is not to be limited by particular details set forth in the above description, as many apparent variations thereof are contemplated without departing from the spirit or scope thereof as hereinafter claimed.

What is claimed is:

1. A torque indicator for a handwheel device, comprising:
   at least one torque indicator marking; and
   a reference pointer aligned with the at least one torque indicator marking, wherein movement of a handwheel positions the reference pointer relative to the at least one torque indicator marking to visually convey the relative amount of torque being applied by the handwheel to an actuator or valve assembly attached thereto, and the at least one torque indicator marking is configured to move with the reference pointer when a sufficient amount of torque is applied by the handwheel to actuate the actuator or valve assembly.

2. The torque indicator of claim 1, wherein the at least one torque indicator marking comprises:
   a first range representing an applied torque within operational tolerances of the actuator or valve assembly;
   a second range representing an applied torque approaching operational limits of the actuator or valve assembly; and
   a third range representing an applied torque outside of operational limits of the actuator or valve assembly.

3. A handwheel device, comprising:
   a drive shaft;
   a drive peg attached to the drive shaft;
   a rotation shaft;
   a rotation peg attached to the rotation shaft;
   at least one force-generating device having two ends, a first end connected to the drive peg and a second end connected to the rotation peg;
   a handwheel connected to the rotation shaft, wherein a torque applied by the handwheel is transmitted from the rotation shaft to the drive shaft by the at least one force-generating device;
   at least one torque indicator marking on the handwheel device; and
   at least one pointer on the handwheel device, the at least one pointer pointing to at least a portion of the at least one torque indicator marking.

4. The handwheel device of claim 3, wherein the at least one force-generating device comprises a spring.

5. The handwheel device of claim 3, wherein the at least one force-generating device comprises at least two force-generating devices connected in series.

6. The handwheel device of claim 3, further comprising:
   a second drive peg attached to the drive shaft at a position opposite the drive peg;
   a second rotation peg attached to the rotation shaft at a position opposite the rotation peg; and
   a spring having two ends, a first end connected to the second drive peg and a second end connected to the second rotation peg.

7. The handwheel device of claim 3, wherein the at least one torque indicator marking is positioned on the drive shaft.

8. A handwheel device, comprising:
   a drive shaft;
   a drive shaft shell attached to the drive shaft;
   a rotation shaft;
   at least one lug connected to the rotation shaft;

at least one force-generating device positioned between the at least one lug and the drive shaft shell;

a handwheel connected to the rotation shaft, wherein a torque applied by the handwheel is transmitted from the rotation shaft to the drive shaft by the at least one force-generating device;

at least one torque indicator marking; and a reference pointer aligned with the at least one torque indicator marking.

9. The handwheel device of claim 8, wherein movement of the handwheel positions the reference pointer relative to the at least one torque indicator marking to visually convey a relative amount of torque being applied by the handwheel device to an actuator or valve assembly attached thereto.

10. A handwheel device, comprising:

a drive shaft;

a handwheel;

at least one flexible spoke connecting the handwheel to the drive shaft, wherein the at least one flexible spoke is configured to bend in a direction about an axis of the handwheel upon a torque applied to the at least one flexible spoke by the handwheel; and at least one torque indicator marking attached to the drive shaft and positioned relative to the at least one flexible spoke.

11. The handwheel device of claim 10, wherein a relative position of the at least one flexible spoke to the at least one torque indicator marking visually indicates an amount of torque being applied by the handwheel to the drive shaft.

12. A handwheel device, comprising:

a drive shaft;

a handwheel;

at least one rotation spoke securing the handwheel in a position relative to the drive shaft, wherein the handwheel is configured to rotate relative to the at least one rotation spoke when a torque less than a torque required to rotate the drive shaft is applied by the handwheel; and at least one torque indicator marking on the handwheel.

13. The handwheel device of claim 12, further comprising a pointer attached to the drive shaft and positioned relative to the at least one torque indicator marking to visually convey the relative amount of torque being applied by the handwheel device to an actuator attached thereto.

14. The handwheel device of claim 12, wherein the handwheel further comprises:

a handwheel rim;

at least one force-generating device mounted on at least a portion of the handwheel rim; and a handwheel cover mounted around at least a portion of the handwheel rim.

15. The handwheel device of claim 12, wherein the handwheel further comprises:

a handwheel rim, wherein the handwheel rim is moveable through a hole in the at least one rotation spoke;

at least one spring having a first end and a second end, the at least one spring mounted around the handwheel rim with the first end positioned next to the at least one rotation spoke; and a handwheel cover mounted over at least a portion of the handwheel rim and in contact with the second end of the at least one spring.

16. The torque indicator of any of claims 1, 10, or 12, further comprising a torque input tattletale device, wherein the tattletale device indicates a maximum amount of torque exerted by the handwheel device on an actuator or valve assembly.

17. The torque indicator of claim 16, wherein the tattletale device is selected from the group consisting of a moveable pin, a crushable material, and a scoring device capable of marking the at least one torque indicator marking.

18. The handwheel device of any of claims 3 or 8, wherein the at least one torque indicator marking is positioned on or attached to the handwheel.

19. A method for visually determining a representative amount of torque applied to an actuator or valve assembly by a handwheel, comprising:

providing a torque indicator marking;

providing a reference pointer, wherein one of either the torque indicator marking or the reference pointer is fixed to a handwheel and the other of either the torque indicator marking or the reference pointer is fixed to a drive shaft for driving the actuator or valve assembly, and the torque indicator marking is configured to move with the reference pointer when a sufficient amount of torque is applied by the handwheel to actuate the actuator or valve assembly; and comparing the position of the reference pointer with respect to the position of the torque indicator marking to determine the representative amount of torque being applied to the actuator or valve assembly.

20. The method of claim 19, further comprising providing a torque indicator marking having three representative torque ranges, wherein a first range represents an applied torque within operational tolerances, a second range represents an applied torque approaching operational limits, and a third range representing an applied torque exceeding the operational limits of the actuator or valve assembly.

* * * * *